United States Patent [19]
Moran

[11] 3,778,721
[45] Dec. 11, 1973

[54] AUTOMATIC TELEVISION PROGRAMMER

[76] Inventor: Robert L. Moran, 4 Mackintosh St., Franklin, Mass.

[22] Filed: Sept. 8, 1972

[21] Appl. No.: 287,557

[52] U.S. Cl. .................................................. 325/396
[51] Int. Cl. .................................................. H04b 1/06
[58] Field of Search ..................... 325/392–396, 470

[56] References Cited

UNITED STATES PATENTS

| | | | |
|---|---|---|---|
| 3,681,541 | 8/1972 | Dozier | 325/396 |
| 3,602,822 | 8/1971 | Evans | 325/470 |

*Primary Examiner*—Albert J. Mayer
*Attorney*—Robert T. Dunn

[57] ABSTRACT

Television channel selection on a TV set is automatically performed according to a stored schedule by a motor which drives the TV set channel selection mechanism, as dictated by a stored schedule of available TV channels versus time. Sets of binary storage elements, each set corresponding to a time interval and each element in a set corresponding to one of the available TV channels are electrically energized to store the schedule. A timer produces sequential time signals at the initiation of each scheduled TV program. Each time signal initiates an output from one of the elements of the set of elements that corresponds to the time interval, represented by the time signal, and so the output from a particular binary storage element, called a channel selection signal, represents the given TV channel and the time interval that channel is programmed for. A timer steps through the stored program comparing the stored channel selection signal at each step with the position of the TV channel selection mechanism, producing a signal which initiates energization of the motor and so provides control for carrying out the program. The apparatus has use to select television programs for display or for recording over substantial periods when the television receiver is not attended.

12 Claims, 5 Drawing Figures

AUTOMATIC TELEVISION PROGRAMMER

The present invention relates to apparatus for automatically controlling channel selection on a conventional TV receiver in accordance with a preset schedule. More particularly, the apparatus automatically selects the channels received by a conventional TV receiver during periods several hours in duration, even while the receiver is not tended.

There are in all major areas of TV receiver use, whether the transmission is by broadcast signals or by cable transmission, a wide variety of programs carried by several channels throughout the day from early in the morning until late in the evening. As is often the case, one's time available for viewing television does not coincide with the most desired television programs. This can be overcome by recording on a video tape recorder the more desired TV programs, as these programs are received, and later playing back the tape on the TV receiver at a more convenient time.

In my copending application Ser. No. 249,360, filed May 1, 1972, there is described and claimed a method and apparatus for storing a schedule of TV channels versus time and controlling the TV receiver channel selection mechanism to carry out the stored schedule. The apparatus described in that copending application includes a motor drive for the channel selection mechanism and a position feedback control for the motor, whereby the motor drives until the mechanism is positioned at the scheduled channel. The schedule of TV channel versus time is stored by a preset matrix of manually connected channel and time interval terminals. Through this matrix, the time interval terminals are sequentially connected in circuit with and they energize position switches on the TV receiver selection mechanism. The position switches control energization of the motor and all are normally closed except the one at which the selection mechanism is positioned. Thus, the motor drives until the selection mechanism opens the energized position switch. At this point the TV receiver is tuned to the scheduled TV channel and remains so until the next time signal initiates connection of the next time interval terminal with a position switch to tune the TV set to the next scheduled TV channel.

In the present invention, the schedule or program of TV channels verus time is stored by sets of binary storage elements programmed by an operator who actuates a set of channel switches which produce channel signals. These switches are actuated by the operator in the sequence of the desired schedule to be stored. The operator also sets the start time that the stored schedule is to commence. Thereafter, at that start time, the TV set is automatically tuned in response to real time signals and the stored schedule to tune the TV set to the selected TV channels. For this purpose, a servo drive with position feedback such as the drive system described in copending application Ser. No. 249,360 may be used.

It is an object of the present invention to provide apparatus for use with or as part of a conventional TV receiver by which the receiver is turned on at a preselected time and is controlled during ensuing intervals to receive preselected TV programs for several available TV channels.

It is a more particular object of the present invention to provide such apparatus including binary electric storage elements for storing a schedule of TV channels versus time by which to control tuning of the TV receiver, the stored schedule being initiated by manipulation of switches representing the several available TV channels.

It is another object of the present invention to provide such apparatus for use in connection with video tape recorders, whereby the received television programs are recorded on the video tape recorder in accordance with the preselection.

Some of the advantages of the present invention are that the user can by a few simple actions preset and store the time the TV receiver is turned on and the sequence of channel programs that are either presented to a viewer or recorded on a video tape recorder. Thus, the TV programs can be screened either for viewing or recording. In the latter case, the user can view the programs recorded at a convenient time. In the apparatus, a clock is set to the time for tuning on the TV receiver and the sequence of channels to be received commencing with the set time is stored. The selection is done simply by manually actuating in the desired time sequence, switches which represent the available TV channels. The sequence of this actuation establishes the time intervals the receiver will be tuned to the channels represented by these switches.

Other objects, features and advantages of the present invention will become readily understood from the following detailed description of embodiments of the invention taken in conjunction with the drawings and particularly pointed out in the claims appended hereto.

Figure 1:
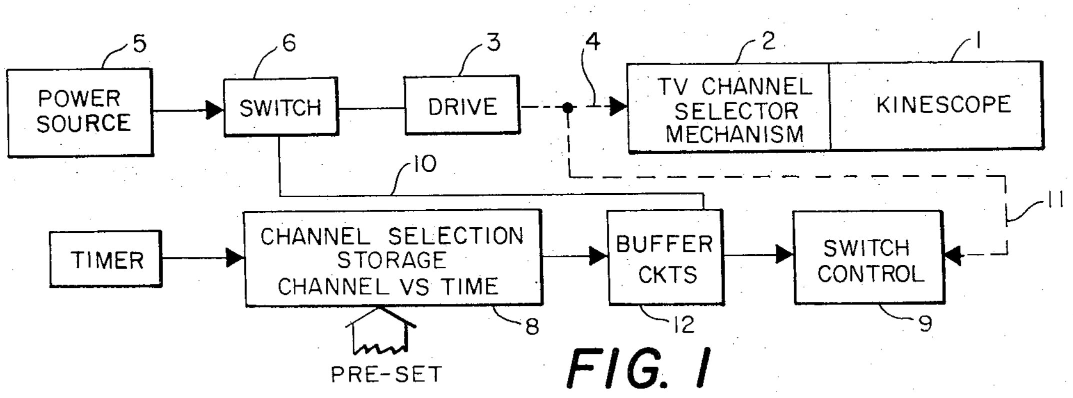
FIG. 1 is a block diagram showing the principal parts of the apparatus and their functional relationships.

Operation of apparatus incorporating features of the present invention is illustrated generally by the block diagram in FIG. 1. Here, the TV receiver which may be a conventional home television receiver is represented by the kinescope 1 and the TV channel selector mechanism 2, which is invariably a part of such a receiver. A drive mechanism 3, which may be an electric motor, mechanically drives the selector mechanism 2 via mechanical linkage 4 and this drive is controlled by power from a source 5 which may be DC or the same AC power which powers the kinescope. A switch 6 feeds this power to the drive 3, and so control of the switch controls the channel selection. This control is accomplished by a timer 7 which initiates the channel selection, the channel selection storage 8, which is programmed by the operator to effect the selection of channels versus time, and a switch control 9 which controls the switch 6 via line 10. The switch control is energized by the output of the storage 8 via buffer circuits 12 and, in effect compares the present position of the channel selector mechanism 2 with the channel called for at that time by the storage 8 and if they are not the same, energizes the switch 6 via line 10 to feed power to the drive 3, which drives the selector mechanism 2 until it arrives at the same channel called for by the storage. The function of the switch control 9 is carried out continually and this control may be structurally an integral part of the selector mechanism 2 as it responds to a mechanical input 11 from the drive or the selector mechanism. Thus, the system shown in FIG. 1 is in mechanical terms a position feedback drive mechanism, which drives to a null signal in the feedback line 10. The system is programmed by the operator who sets program 8 and so stores therein a schedule of TV channels versus time, so that the system is controlled by storage 8 to mechanically tune the TV receiver at the scheduled time intervals to the programmed TV channels.

Figure 2:
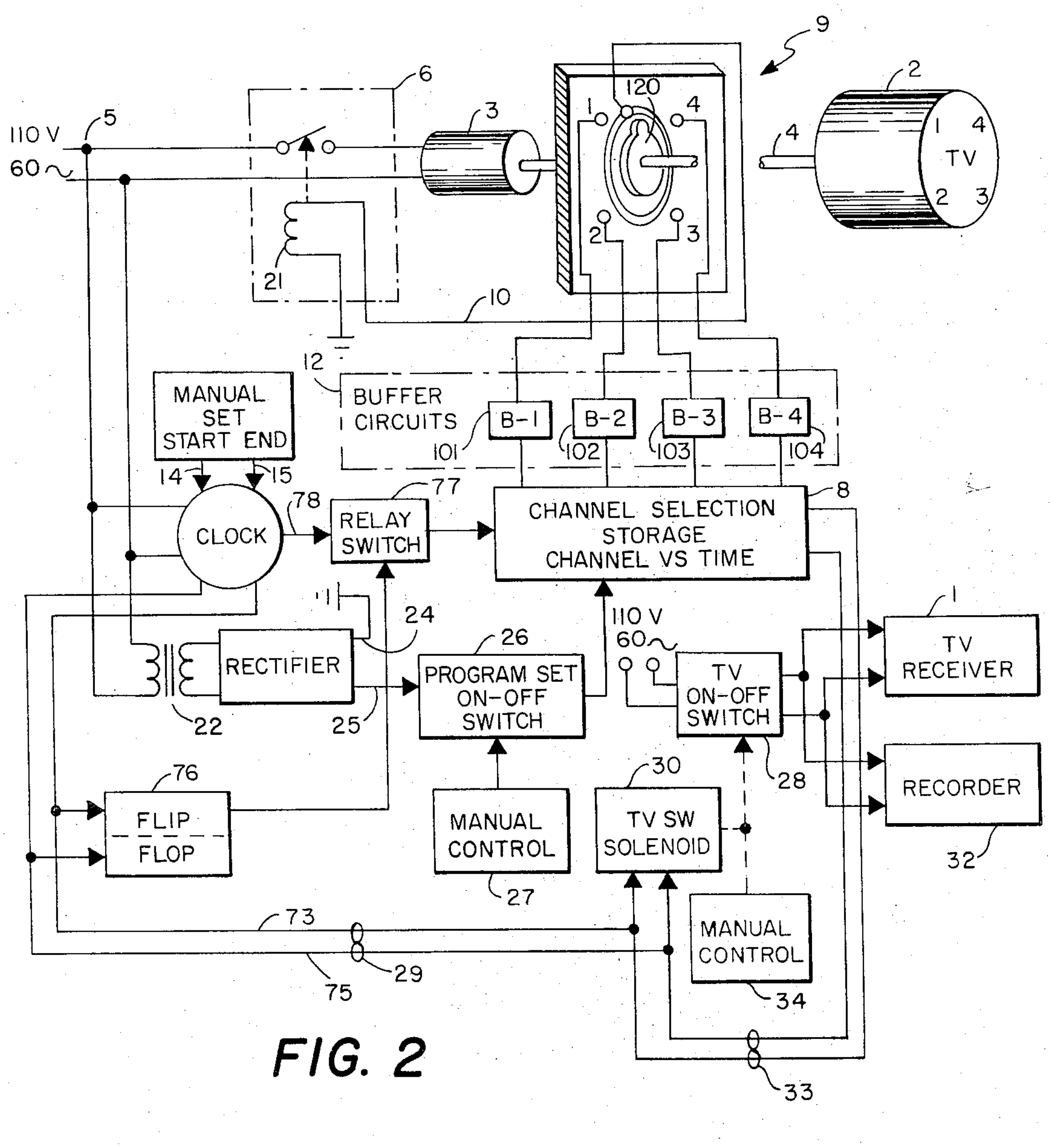
FIG. 2 is a combination structural diagram and electrical block diagram of the apparatus in accordance with one embodiment of the present invention.

A structure for implementing the system shown in FIG. 1 in accordance with one embodiment of the present invention is shown in FIG. 2. This apparatus is shown partly by electrical block diagram and mechanical schematic and partly by perspective views of some of the mechanical parts. Where some of these parts singly or in combination function as the parts described with repect to FIG. 1, they have the same reference number. In FIG. 2, the power source 5 is 120 volt, 60 cycle power line, which energizes the motor 3 via the switch 6. This switch is a relay switch having a coil 21 which is energized via line 10. The motor drives the channel selector mechanism 2 when the motor is energized via the switch and positions the mechanism to tune the television receiver. The mechanical coupling between the motor and the selector mechanism is provided by drive shaft 4.

AC power from the source 5 also energizes the timer or clock 7. Power to the storage 8 and other controls is via a transformer 22 feeding a full wave rectifier 23 which provides low voltage DC power for inergizing everything in the system except the motor, the clock and the TV receiver, One terminal output 24 from the rectifier is grounded and the other 25 is at a nominal DC voltage suitable for energizing the relays, solenoids and binary circuits in the storage 8 of the system.

Line 25 from the rectifier energizes the storage 8 via the program set ON-OFF switch 26 which is controlled manually at an instrument panel by manual control 27. When so energized, the storage 8 is ready to be programmed or scheduled with the operator's selection of available TV channels versus time interval and to hold the schedule until the time arrives to carry out the schedule. At that time the TV receiver is automatically turned on by a signal from the clock 7 and the storage 8 controls the motor 3 to carry out the stored schedule at each time interval signal from the clock. At the end of the schedule, a signal from the clock turns off the TV receiver.

The clock 7 is equipped with two manual settings, 14 and 15, one to start the automatic control according to the schedule in program 8 and one to stop it, and to accomplish this the clock controls the TV receiver ON-OFF switch 28 via lines 29 to the ON-OFF switch solenoid 30. This switch provides power to the TV receiver 1 and to the video recorder 32, so that the TV receiver and the recorder, are turned on and off at the same time at the beginning and end of the program schedule.

The program schedule may not be continuous from beginning to end. For example, from the beginning to the end of the schedule it may be desired that some time intervals be skipped and no recording be made. These intervals to be skipped are stored in storage 8 as part of the schedule. The storage 8 produces signals in lines 33 for controlling the ON-OFF relay 30 just as the signals in line 29 from the clock. The ON-OFF switch is also controlled manually by manual control 34.

Figure 3:
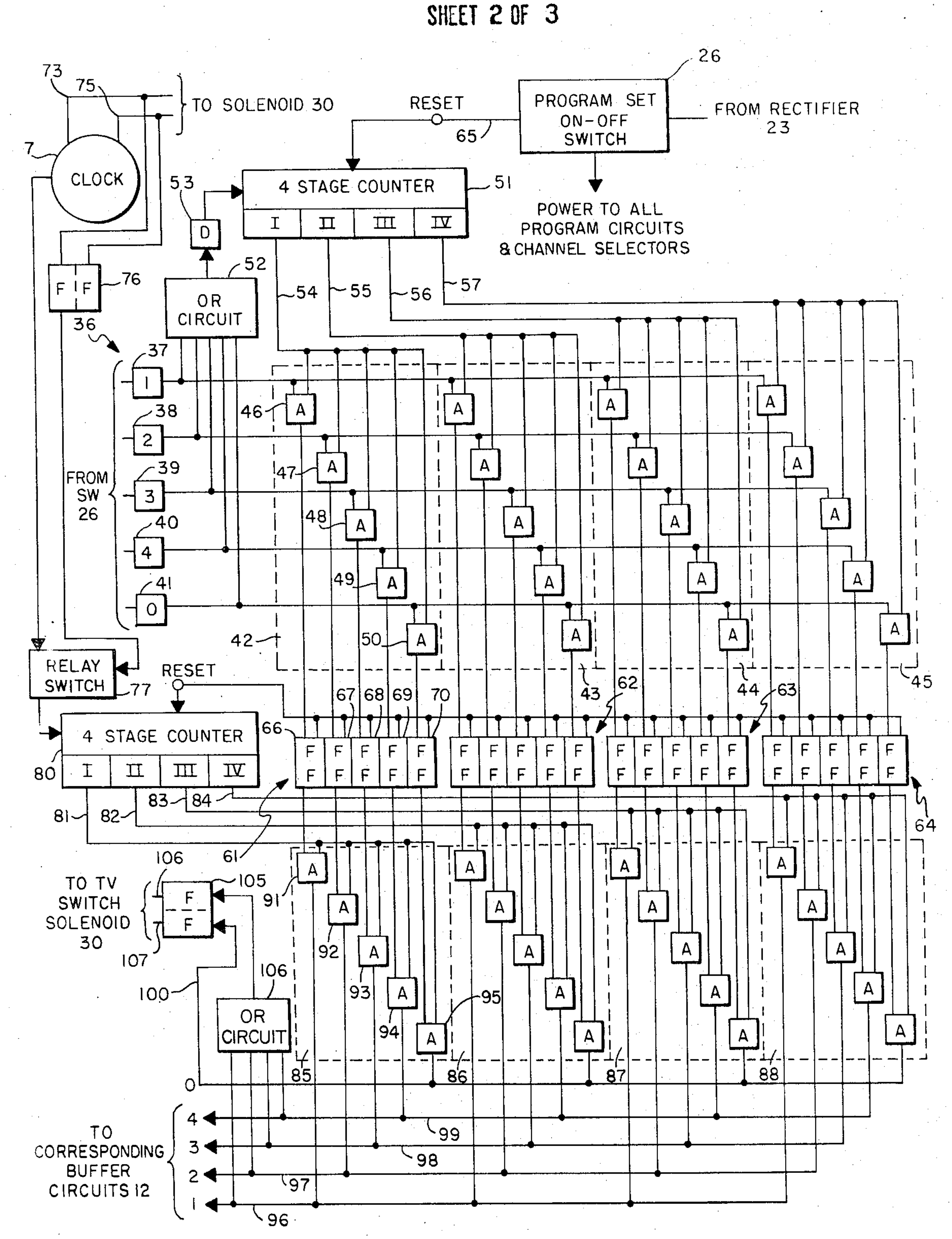
FIG. 3 is an electrical block diagram showing the details and logic of the channel selection storage (channel vs time) apparatus shown in FIGS. 1 and 2.
Figure 4:
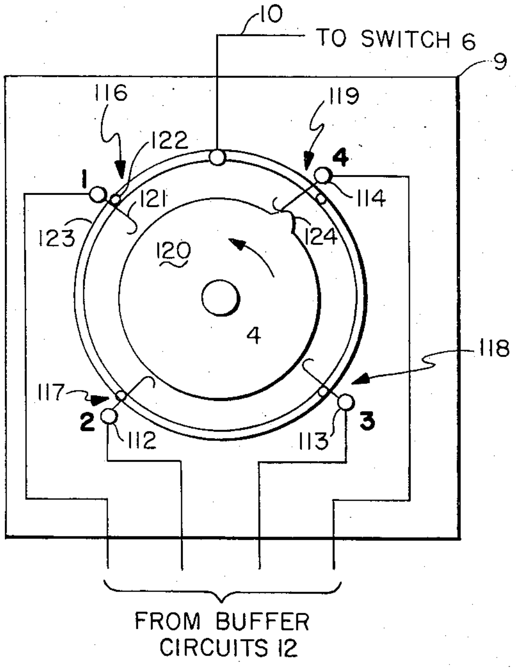
FIG. 4 illustrates the detailed structure of the channel switch cam and channel switches, which is part of the structure shown in FIG. 2.

The channel selection storage 8 is a system of binary logic circuits which are preset or programmed by the operator to store the desired schedule of TV channels versus time. This system is shown in FIG. 3. The program set switch 26, in the ON position, energizes lines 35 to a set of manually controlled switches 36. This set includes a programming switch for each of the available TV channels which are identified by the channel numbers 1 to 4 and an additional programming switch identified as 0 for the intervals between the start and end of the schedule when no reception or recording is desired. The channel switches are denoted 37 to 40 and the additional switch is denoted 41. These switches 37 to 41, along with the clock 7, manual sets 14 and 15 for the clock and manual controls 27 and 34 are located on the operator's control panel shown in FIG. 5.

The outputs of programming switches 36 provide one of the inputs to each of binary AND circuits in sets of AND circuits 42 to 45 which are called time interval program storage input sets. Each of these sets of AND circuits includes a different AND circuit responsive to each of the channel switches 37 to 40. In set 42 the AND circuits 46 to 50 respond to switches 37 to 41, respectively. These switch outputs are also applied to four stage counter 51 via OR circuit 52 and delay 53 and an output therefrom in line 54, representing a count of one, which is the first time interval, denoted I, is applied to all the AND circuits 46 to 50 in set 42. The counter 51 also provides time interval signal denoted II, III and IV representing counts of two, three and four of the counter 51 in lines 55, 56 and 57, respectively. The signals in these lines feed the AND circuits in time interval program storage input sets 43, 44 and 45, respectively.

The output of each AND circuit in each of the sets 42 to 45 is applied to one input of a different one of the bistable flip flop circuits arranged in sets 61 to 64. These circuits are binary storage elements and serve to store the TV channel versus time schedule for controlling tuning of the TV receivers to carry out the schedule. The other input to each of the flip flop circuits is energized by a rest pulse in line 65 produced when the program set switch 26 is turned off. The binary storage elements (flip-flops) in set 61 are denoted 66 to 70 and respond to the output from AND circuits 46 to 50, respctively. Each of these elements produces a single output from one stage and when programmed, only one element in each set produces an output and that output represents the TV channel for the time interval that the set corresponds to. For example, the output from an element in set 61 dictates the TV channel the receiver is tuned to during the time interval I and the output from an element in set 62 dictates the TV channel during time interval II, and so forth.

The condition of the storage elements after they are programmed remains until the program set switch 26 is turned off and so this switch must remain on from the time of programming until the programmed schedule goes through its complete cycle beginning with time interval I to the end of interval IV. Thereafter, the program may remain as an indication to the operator of what TV channels have been received and recorded.

Figure 5:
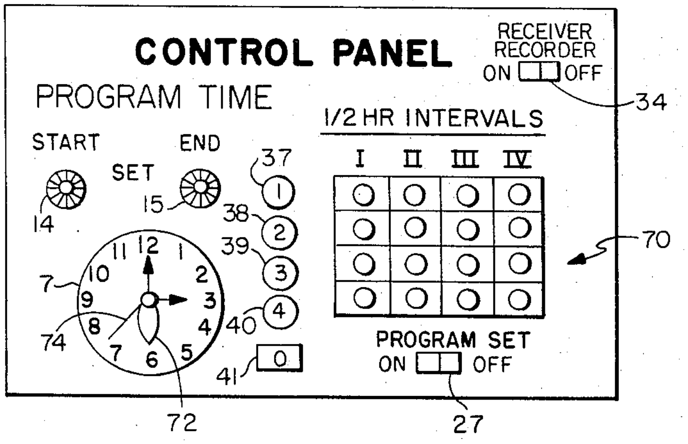
FIG. 5 shows the operators control panel for apparatus shown in FIGS. 1 to 4.

For this purpose, the outputs from the binary storage elements in sets 61 to 64 may energize indicator lights in an array of lights 70 on the operator's control panel shown in FIG. 5. Each such indicator light identifies one of the TV channels 1 to 4 and one of the time intervals I to IV.

Control of tuning of the TV receiver by the stored program commences when the clock time coincides with the programming start time set on the clock by manual control 14. This control moves the start pointer 72 on the face of the clock to indicate the start time. When the clock time coincides with this, a signal is produced in line 73 from the clock which energizes solenoid 30 so that the solenoid turns on the TV ON-OFF switch 28 which provides AC power to the receiver 1 and the recorder 32. The programming end time is set on the clock by manual control 15. This control moves the end pointer 74 on the face of the clock to indicate the end time. When the clock coincides with this a signal is produced in line 75 from the clock which energizes the solenoid 30 so that the solenoid turns off the TV ON-OFF switch 28. The lines 73 and 75 also both energize bistable flip flop circuit 76, that controls relay switch 77, that controls timing pulses from the clock in line 78. These timing pulses are provided at the beginning of each of the time intervals I to IV. These intervals may be, for example, one half hour each and begin on the hour and half hour. Thus, the timing pulses in line 78 would occur each half hour.

The timing pulses which are gated by the flip flop 76 and relay 77 are those pulses which occur between the times set on the clock for programming to start and end. Thse pulses are fed to four stage counter 80 in storage 8 and the outputs of this counter denoted I, II, III and IV in lines 81 and 84 are signals coincident in real time with the programmed time intervals as set on the clock and commenced by pulses in line 78. The signals in lines 81 to 84 are referred to herein as interval count signals and each is fed to all the AND circuits in one of the sets of AND circuits 85 to 88. The set 85 responds to interval count signal I in line 81, and sets 86 to 88 respond to count signals II, III and IV in lines 82 to 84, respectively. In each of these sets, such as set 85 there are five AND circuits 91 to 95 which respond to the five binary storage elements (flip flops) 66 to 70 and these in turn are programmed by the four channel switches 37 to 40 and the 0 switch 41, respectively. The same relationship exists for AND circuits in sets 86 to 88 except that read out from these sets occurs at time intervals denoted II, III and IV, respectively.

The outputs from the sets of AND circuits 85 to 88 are combined as shown in FIG. 3 with the output of the AND circuit of each set which calls for TV channel 1 coupled to line 96, and the others of each set which call for TV channels 2, 3, 4 and 0 coupled to lines 97 to 100, respectively. These lines carry signals to buffer circuits 12 including a separate buffer for each line except line 100 which calls for 0 channel. The buffer circuits 101 to 104 are denoted B1 to B4 energize position switch terminals in the switch control 9 which functions as described more fully below.

Line 100 which calls for 0 channel feeds one input of a bistable flip flop circuit 105. The other input of 105 is energized by the signals in lines 101 to 104 via OR circuit 106 and so the state of flip flop 105 indicates in real time whether or not receiving and recording has been programmed during the programming interval. The output of flip flop 105 in lines 106 and 107 combines with lines 73 and 75, respectively, to energize solenoid 30 turning TV switch 28 on or off.

The buffer circuits 101 to 104 identified as B1 to B4 directly energize switch terminals 111 to 114 on switch plate 115 arranged in a circle corresponding to the positions of the channel selector mechanism 2, by which these channels are selected for reception when the shaft 4 rotates the selector mechanism. An enlarged view of the switch plate 115 and the terminals and switches located thereon is shown in FIG. 3.

Each of the terminals 111 to 114 on the channel switch plate connects to a separate one of the channel switches 116 to 119 arranged on a circle around the axis of the channel switch cam 120, which may be mounted on the rotor drive shaft 4 between the motor 3 and the channel selector mechanism 2. The arm of each of these channel switches such as arm 121 of switch 116 normally contacts a terminal such as 122 on conductive ring 123 and so these switches are normally closed. Each of these switches is opened when the contoured part 124 of cam moves the switch arm away from the terminal on the conductor ring 123. This conductive ring electrically connects to the relay 21 in switch 6 to complete the circuit.

In operation, the operator sets the start and end times on the clock 7 by manipulating dials 14 and 15. Then switch 26 is turned on to energize the program circuits including the sets of storage elements. The operator then actuates the switches 37 to 41 which are denoted by channel number, or switch 41 denoted 0 to store the desired program. For example, suppose recording is to begin at 6:00 o'clock and end at 7:30 o'clock and the first recording for a half hour is to be channel 4 followed by no recording for a half hour and then a half hour recording of channel 2. The operator programs this by actuating in sequence switches or the control panel marked 4, 0 and 2. If the schedule desired were channel 4 for a half hour and then channel 2 for an hour, the operator would actuate the switches in the sequence 4, 2 and then 2 again.

The embodiment of the present invention described herein accomodates scheduling four TV channels over four time intervals. Clearly similar structure or arrangement of circuits could be provided for many more channels over many more intervals. If more of either were required then more circuits would be provided. However, the relationship and operation of the circuits would be substantially the same as described herein.

The structure described herein for driving the TV receiver channel selection mechanism or system, is similar to that described in the above mentioned copending application Ser. No. 249,360. Clearly, other apparatus could be employed for tuning a TV receiver to the scheduled channels in response to the stored schedule in the binary storage elements. For example, the receiver might be tuned by separate switches each individually operated by a separate solenoid. These solenoids could be energized by the buffer circuits 12 to accomplish the scheduled tuning.

The receivers might be tuned electronically by manually actuated electronic switches and so a motor or solenoids or other electro-mechanical device would not be required to accomplish the tuning. Instead, the output of buffer circuits 12 could be applied to substitute for the output of the electronic switches and so accomplish the tuning. When separate switches are used to tune, whether solenoid controlled or electronically controlled, there is no feedback as with the motor drive tuning described herein and in copending application Ser. No. 249,360.

The various parts of embodiments of the present invention described herein are selected with a view toward availability, cost, and reliability and many of the parts are commercially available with a minimum of adaptation required. It is to be understood that the structural features and functions of the embodiments described are illustrative of the preferred structures, however, many modifications may be made without departing from the spirit and scope of the invention, as set forth in the appended claims.

What is claimed is:

1. In apparatus for automatically selecting a TV channel from among a plurality of available TV channels on a TV set having a channel selection system, means for controlling the channel selection system and means producing time signals for initiating successive TV channel intervals, programmable means for storing the selection of TV channels for successive intervals and controlling the set during said successive intervals comprising in combination, means producing channel signals each representative of one of the available TV channels, means for counting said channel signals and producing a count output signal representative of the count, means simultaneously responsive to said channel signals and the output of said counting means for providing channel selection signals which represent the selected time sequence of TV channels to be automatically selected on the TV set, means for storing said channel selection signals, and means simultaneously responsive to said stored channel selection signals and said time signals for providing signals for initiating operation of the channel selection control means, whereby the TV set channel selection system selects the stored selection of TV channels at the sequential intervals.

2. In apparatus as in claim 1 wherein, the channel signals are produced in different electrical lines, each count signal is produced in a different electrical line, means are provided for comparing coincidence of each channel signal with each count signal and for storing the occurrence of said coincidence in a plurality of sets of binary storage elements which produce said channel selection signals, each set of binary storage elements storing the TV channel selection for a different successive interval.

3. In apparatus as in claim 2 wherein, the means for comparing coincidence of each channel signal with each count signal include sets of binary AND circuits, each set corresponding to a set of said binary storage elements, whereby corresponding sets of AND circuits and binary storage elements correspond to the different successive intervals.

4. In apparatus as in claim 3 wherein, each corresponding set of AND circuits and set of binary storage elements includes an AND circuit controlling a storage element responsive to only one of the channel signals.

5. In apparatus as in claim 2 wherein, means are provided for counting said time signals producing interval count signals, and means simultaneously responsive to said channel selection signals and said interval count signal for providing said signals for initiating energization of the channel selection mechanism actuating means.

6. In apparatus as in claim 5 wherein, said last mentioned means simultaneously responsive to said channel selection signals and said interval count signals include sets of binary AND circuits each set corresponding to a set of said binary storage elements, whereby corresponding sets of said last mentioned AND circuits and binary storage elements correspond to different successive intervals.

7. In apparatus as in claim 2 wherein, means are provided for producing a no channel signal in sequence with said channel signals and said no channel signal when so produced is stored by a binary storage element of one of said sets of binary storage elements.

8. In apparatus as in claim 1 wherein, the means for actuating the channel selection mechanism includes a motor and a switch for controlling energization of the motor and means are provided which respond to the position of the selection mechanism for controlling said motor switch.

9. In apparatus as in claim 8 wherein, the signals for initiating energization of the channel selection drive means control the motor switch and are compared by the last mentioned means with the position of the selection mechanism, whereby the motor drives the selection mechanism until said signal and position correspond.

10. In apparatus as in claim 1 wherein, the switch control means in the apparatus provides position feedback, whereby the motor drives the channel selection mechanism to a null position corresponding to programmed channel at any particular sequential interval.

11. In apparatus as in claim 8 wherein, the switch control means includes a plurality of position switches, one corresponding to each channel position of the channel selection mechanism, each of said switches is actuated when the channel selection mechanism is at the corresponding position, and said switches control energization of the motor switch.

12. In apparatus as in claim 11 wherein, the timer includes a regularly energized stepping switch which sequentially energizes each of a plurality of interval terminals, and said interval terminals connect to the position switches via the programmable means.

* * * * *